United States Patent

Bach et al.

[11] Patent Number: 5,418,555
[45] Date of Patent: May 23, 1995

[54] REVERSIBLE OR IRREVERSIBLE PRODUCTION OF AN IMAGE

[75] Inventors: Volker Bach, Neustadt; Karl-Heinz Etzbach, Frankenthal; Harald Fuchs, Carlsburg; Karl Siemensmeyer, Frankenthal; Gehard Wagenblast, Weisenheim, all of Germany

[73] Assignee: BASF Aktiengesellschaft, Ludwigshafen, Germany

[21] Appl. No.: 975,886

[22] Filed: Nov. 13, 1992

Related U.S. Application Data

[62] Division of Ser. No. 840,259, Feb. 24, 1992.

Foreign Application Priority Data

Feb. 28, 1991 [DE] Germany ............... 41 06 353.8

[51] Int. Cl.$^6$ ............... G01D 9/00; G01D 15/06
[52] U.S. Cl. ............... 346/135.1; 347/153.1
[58] Field of Search ............... 346/135.1, 153.1

[56] References Cited

U.S. PATENT DOCUMENTS 4,995,705  2/1991  Yoshinaga et al. ............... 350/350 S
5,153,618  10/1992  Frank et al. ............... 346/159

Primary Examiner—Jr. Miller
Attorney, Agent, or Firm—Keil & Weinkauf

[57] ABSTRACT

In a novel process for the reversible or irreversible production of an image by the imagewise action of energy on a recording layer, resulting in a pattern of surface charges which corresponds to the imagewise action of the energy, on the surface of the recording layer, the recording layer used is one which contains or consists of an organic material which solidifies in glassy form, is nonphotoconductive or only slightly photoconductive and has permanent dipoles, wherein the pattern of surface charges is produced, without or almost without formation of free charge carriers, by reversible imagewise orientation of some or all of the permanent dipoles present in the recording layer, with the aid of an electric field applied imagewise. The novel process is advantageously carried out using a novel apparatus which comprises a suitable recording element, apparatus for the imagewise action of an electric field on the recording layer of the recording element and a counter-electrode which is in direct, non-frictional contact with the recording layer and can be removed again therefrom. The pattern of surface charges which is produced by the novel process can be treated with liquid or solid toners. The resulting toner image can then either be fixed on the recording layer or transferred from the recording layer to another surface, after which the pattern of surface charges can be deleted by uniform action of energy. Thereafter, a further image can be produced. In this way, it is possible to produce photocopies without the high voltage sources required in the conventional electrophotographic processes having to be used.

8 Claims, 1 Drawing Sheet

| a - recording layer |
| e - orientation layer |
| d - electrode layer |
| c - dimensionallystable subtrate |

} Apparatus for the imagewise exposure of energy (B) with electrode and leads
C - movable electrode } recording element (A, D, E)

The recording layer (A, D, E) consists of

Recording element

REVERSIBLE OR IRREVERSIBLE PRODUCTION OF AN IMAGE

This is a division of application Ser. No. 840,259, filed Feb. 24, 1992.

The present invention relates to a novel process for the reversible or irreversible production of an image by imagewise action of an electric field, with the result that a pattern of surface charges which corresponds to the imagewise action of the electric and/or magnetic field results on the surface of a recording layer.

Processes of this type, in which patterns of surface charges can be produced in a very wide variety of ways utilizing different physical mechanisms are known. Examples are xerography and electrophotography, in which a photoconductive recording layer is provided with a positive or negative electric charge, for example by means of a high voltage corona discharge, after which the electrically charged recording layer is exposed imagewise to actinic light. As a result of exposure to light, the photoconductive recording layer becomes electrically conductive in its exposed parts, so that the previously produced electrostatic charge in these parts can flow away via an electrically conductive substrate. This produces a latent electrostatic image on the photoconductive recording layer, which image can be developed with the aid of suitable liquid or solid toners to give a visible image. This toner image can then be transferred from the recording layer to another surface in a conventional manner, resulting in a photocopy. On the other hand, the toner image can also be fixed on the photoconductive recording layer, for example by heating, after which the exposed and therefore toner-free parts of the photoconductive recording layer can be washed away with the aid of suitable liquid developers. The resulting relief layer can then be used, for example for printing purposes. The physical process on which this method of imagewise information recording is based is also known in the scientific literature by the name Carlson process. In summary, it may be said that, in xerography, the pattern of surface charges is formed by the production and imagewise removal of free charge carriers.

It is known that the xerographic process has disadvantages. Thus, for producing the high voltage corona discharge for charging the surface of the photoconductive recording layer, it is necessary to use direct current voltages of the order of from 6 to 10 kV, which gives rise to safety problems and, owing to the formation of ozone, also toxicological problems. Because, furthermore, the pattern of surface charges is formed by free electrical charges, the success of the process is adversely affected by the presence of water. This means that excessively high atmospheric humidity causes premature loss of the surface charges even in the dark or prevents sufficient charging of the surface of the photoconductive recording layer. Moreover, it is not possible in xerography to produce a plurality of copies by a single exposure operation.

A modified xerographic process which to a certain extent overcomes these disadvantages is disclosed in DE-A-15 22 688. In this known process, the pattern of surface charges is produced by uniformly exposing a suitable photoconductive recording layer to light in the presence of an electric field having a field strength of 1,000 to 15,000 V/cm. This produces a uniform internal electrical polarization in the recording layer. The pattern of surface charges is then formed by local destruction or modification of the internal polarization. Thus, in contrast to xerography, the pattern of surface charges in the narrow sense is a residual electrical polarization image which consists either of electrically positively or electrically negatively charged parts and uncharged parts or of electrically positively and electrically negatively charged parts. This residual electrical polarization image can be treated with liquid or solid toners in a conventional manner, and it is possible to treat the residual electrical polarization image composed of electrically negatively and electrically positively charged parts simultaneously with two toners of opposite electrical charge and different colors.

This known process still has many disadvantages. For example, the photoconductive recording layer to be used here is a comparatively thick (from 15 to 55 $\mu$m) inhomogeneous layer of a photoconductive pigment which is embedded in an electrically insulating substrate material. This substrate material, which is essential for the known process, makes it impossible to reduce the thickness of the recording layer. Furthermore, a very high voltage must still be applied to the photoconductive recording layer to ensure the success of the process, ie. the reversible production of an image. In addition, it is advisable to shield the polarized photoconductive recording layer from the undesirable action of light, which generally increases the cost of the apparatuses required in the known process. Because the known process is still based on a production of free charge carriers, the polarized photoconductive recording layer is still sensitive to atmospheric humidity, and the electrical charges may once again compensate one another at elevated temperatures, leading finally to an unstable image. Furthermore, charge images which are composed of oppositely polarized parts, ie. electrically negatively and electrically positively charged parts, can be produced only with the aid of a further electrode which is present directly on the photoconductive recording layer and cannot be removed. However, this further electrode often reduces the adhesion of the toner to the correspondingly charged parts of the pattern, which dramatically impairs the quality of the photocopies to be produced.

It is an object of the present invention to provide a novel process for the reversible or irreversible production of an image, in which a pattern of surface charges which corresponds to imagewise exposure to the electrical field results on the surface of a recording layer by imagewise exposure to an electrical field, and which no longer has the disadvantages of the prior art.

It is a further object of the present invention to provide a novel process for the production of two-color photocopies, in which a residual electrical polarization image which is composed of electrically positively and electrically negatively charged parts is produced on the surface of a recording layer, and this novel process too should no longer have the disadvantages of the prior art.

It is a further object of the present invention to provide a novel process for the production of multicolor copies or prints, in which a residual electrical polarization image which corresponds to the proportion of the particular base color and is composed of electrically charged and uncharged or electrically positively and electrically negatively charged parts is produced on the surface of a recording layer, and in this case too the disadvantages of the prior art should no longer occur.

Not least, it is an object of the present invention to provide a novel apparatus which enables the novel process for the reversible or irreversible production of an image and the novel photocopying process to be carried out especially easily and efficiently.

We have found, surprisingly, that these objects are achieved by the novel process for the reversible or irreversible production of an image by imagewise exposure to an electrical field on a recording layer (a), resulting in a pattern of surface charges which corresponds to the imagewise exposure to an electrical field, on the surface of the recording layer (a), the novel process for the production of two-color or multicolor photocopies by producing a residual electrical polarization image, which is composed of electrically positively and electrically negatively or electrically charged and uncharged parts or contains such parts, on the surface of the recording layer (a) and the novel apparatus for the reversible or irreversible production of an image in which both the novel processes and the novel apparatus utilize a recording layer (a) in which the pattern of surface charges or the residual electrical polarization image can be produced without or virtually without the formation of free charge carriers and without the use of high electrical voltages, by reversible imagewise orientation or by reversible imagewise destruction of the orientation of permanent dipoles.

Surprisingly, layers which have contributed to this achievement are those which exhibit nematic liquid crystalline, smectic liquid crystalline, chiral smectic liquid crystalline or enantiotropic, ferroelectric smectic liquid crystalline behavior, so that, with sufficient exposure to an external electric field, they either (i) can be converted into a polarized nematic or polarized smectic liquid crystalline order state and can be frozen in glassy form in this state after cooling or (ii) can be switched to and fro between two thermodynamically stable (enantiotropic), ferroelectric, smectic liquid crystalline order states or between different chiral smectic liquid crystalline order states induced by the electric field.

Accordingly, the present invention relates to a novel process for the reversible or irreversible production of an image by imagewise exposure to energy on a recording layer, resulting in a pattern of surface charges which corresponds to the imagewise action of the energy on the surface of the recording layer (a), wherein
(1) the recording layer (a) contains, or consists of, a non-photoconductive or only slightly photoconductive organic material which solidifies in glassy form and has permanent dipoles, and
(2) the pattern of surface charges is produced therein without or virtually without formation of free charge carriers by reversible imagewise orientation of some or all of the permanent dipoles present in the recording layer (a) with the aid of an electric field applied imagewise.

The present invention furthermore relates to a novel apparatus which enables the novel process to be carried out in a particularly simple and efficient manner.

In view of the prior art, it could not be expected that the object of the invention could be achieved by the novel process and by the novel apparatus, the extremely large number of advantageous possible embodiments of the novel process on the one hand and the equally numerous possible applications of the novel apparatus on the other hand being even more surprising.

Consequently, the novel process for the reversible or irreversible production of an image by imagewise exposure to an electrical field on a recording layer (a), resulting in a pattern of surface charges which corresponds to the imagewise exposure to the electric field on the surface of the recording layer (a), is referred to as novel process for short.

For the same reason, the novel apparatus which is used for the reversible or irreversible production of an image by imagewise exposure to an electric field on the recording layer (a), resulting in a pattern of surface charges which corresponds to the imagewise action of the electric field on the surface of the recording layer (a), is referred to as novel apparatus.

The novel process is carried out with the aid of the recording layer (a).

Figure 1:
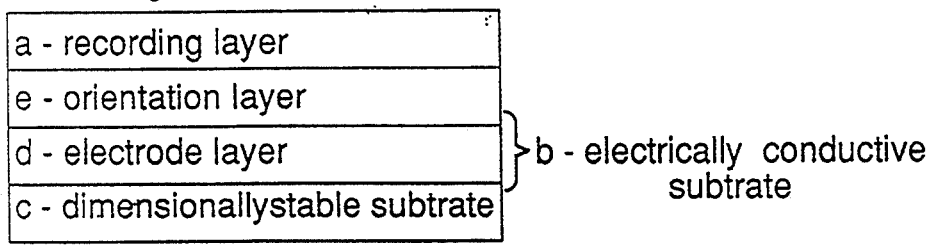
FIG. 1 shows the full recording element, consisting of the recording layer (a), orientation layer (e), electrode layer (d) and dimensionally stable layer (c), with (e) and (d) together comprising the electrically conductive substrate (b).
Figure 2:
FIG. 2 shows the recording element (A,D,E, and also the description in FIG. 1) with the apparatus for imagewise exposure of energy (B) with electrode and leads, comprising a movable electrode (c).
Figure 2:
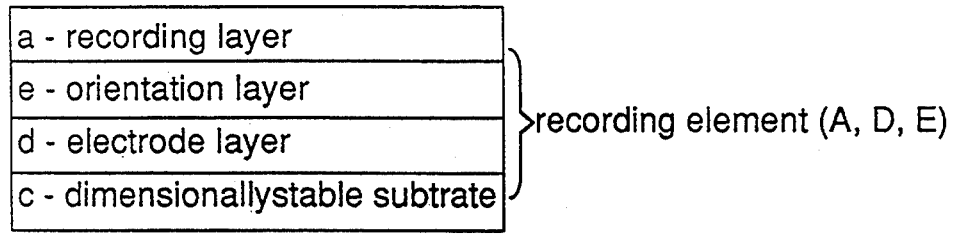
Figure 3:
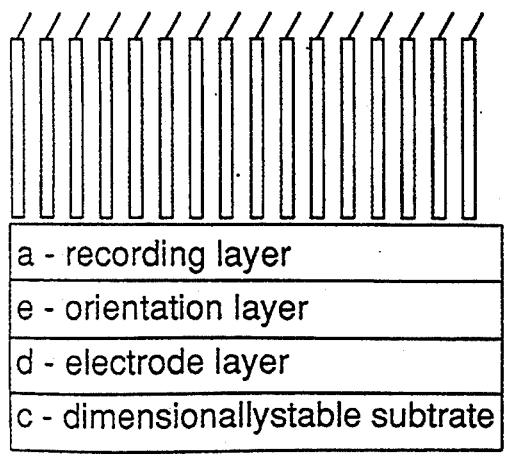
FIG. 3 is similar to FIG. 2, except that the apparatus (B) comprises a fixed, structured electrode row (F).

According to the invention, suitable recording layers (a) are all those which contain or consist of a non-photoconductive or only slightly photoconductive organic material which solidifies in glassy form and has permanent dipoles, recording layers (a) which consist only of one such organic material being very suitable and therefore preferred according to the invention.

Accordingly, all organic materials which are non-photoconductive or only slightly photoconductive, solidify in glassy form and have permanent dipoles and in which, owing to the lack of conductivity or only slight conductivity, very few, if any, free charge carriers are present can be used.

These suitable organic materials to be used according to the invention may be low molecular weight, oligomeric or high molecular weight compounds and, in the case of the high molecular weight compounds, they may furthermore be two-dimensionally or three-dimensionally crosslinked. Among these compounds, those having liquid crystalline behavior are preferably used for the application according to the invention.

Examples of particularly suitable organic materials to be used according to the invention are those having nematic liquid crystalline, smectic liquid crystalline, chiral smectic liquid crystalline or ferroelectric smectic liquid crystalline behavior. Among these, those having nematic liquid crystalline, chiral smectic liquid crystalline and/or ferroelectric smectic liquid crystalline behavior are particularly preferably used and those having chiral smectic liquid crystalline or ferroelectric smectic liquid crystalline behavior are very particularly preferably used.

The compounds particularly preferably used for the application according to the invention and having nematic and/or smectic liquid crystalline behavior contain permanent dipoles which are usually not oriented in such a way that a macroscopic dipole moment results. However, their permanent dipoles can be preferentially oriented in the field direction at appropriate temperatures by means of an electric field. After cooling of the relevant organic material below its glass transition temperature $T_G$, the orientation of the permanent dipoles is frozen in glassy form, so that a macroscopic dipole moment results (cf. U.S. Pat. No. 4,762,912).

Examples of particularly suitable compounds which are particularly preferably to be used for the novel application and have nematic liquid crystalline behavior are disclosed in U.S. Pat. No. 4,762,912, EP-A-0 007 574, EP-A-0 41 512 or EP-A-0 171 045.

Noteworthy compounds among those very particularly preferably used for the novel application and having chiral smectic liquid crystalline or ferroelectric smectic liquid crystalline behavior are compounds which, in thin layers, exhibit enantiotropic, chiral smectic liquid crystalline and/or ferroelectric smectic liquid crystalline behavior, so that they can be switched to and fro between different order states when sufficiently exposed to an external electric field.

Chiral mesogenic compounds or groups which contain one or more optically active centers are known to exhibit such behavior. These compounds or groups may form a chiral smectic liquid crystalline and/or ferroelectric smectic liquid crystalline phase in which the chiral mesogenic compounds or groups are all oriented parallel by the intermolecular interactions and are combined to form microlayers stacked one on top of the other with the same spacings.

In the absence of an external electric field, the chiral smectic liquid crystalline phases have no spontaneous electrical polarization. By applying an external electric field, a polarization which is proportional to the applied field and can be frozen in the glassy state can be induced in this chiral smectic liquid crystalline phase. The sign of the polarization induced by the field depends on the direction of the electric field.

The chiral smectic liquid crystalline phase has the microlayer structure generally typical of smectic liquid crystalline phases, the longitudinal molecular axes of the chiral mesogenic compounds or groups in the individual microlayers having on average a tilt angle $\theta$ of 0° with respect to the layer normal $\vec{Z}$. The direction of inclination and the dimension of inclination or the tilt angle $\theta$ of the longitudinal molecular axes in the microlayer with respect to the layer normal $\vec{Z}$ are characterized by the director $\vec{n}$ and can be determined from the magnitude and direction of the applied electric field. This is also associated with an orientation of the lateral dipole moments of the chiral mesogenic compounds or groups to form a macroscopic dipole moment at right angles to the director $\vec{n}$ and at right angles to the layer normal $\vec{Z}$. However, in the absence of an electric field, there is no optically detectable tilt or no optically detectable inclination of the director $\vec{n}$ to the layer normal $\vec{Z}$, ie. no orientation of the dipole moments, and hence also no macroscopic polarization.

If, however, such a chiral smectic liquid crystalline phase is heated in an external electric field of suitable sign and of suitable orientation or exposed to a very strong external electric field of suitable sign and of suitable orientation, a polarization dependent on the particular chiral substance used and proportional to the electric field can be induced, so that the polarization vector $\vec{P}$ and the direction of the external field coincide. This polarization is based on the tilting of the longitudinal molecular axes of the chiral mesogenic compounds or groups through a tilt angle $\theta$ which is induced by the field and is dependent on the magnitude and direction of the electric field. Since the tilting of the longitudinal molecular axes of the chiral smectic liquid crystalline compounds or groups describes a conical path, the chiral smectic liquid crystalline order states change very rapidly, and the switching times $\tau$ for switching the chiral smectic liquid crystalline phase to and fro between these chiral smectic liquid crystalline order states are very short.

Even in the absence of an external electric field, the ferroelectric smectic liquid crystalline phases have a spontaneous electrical polarization, and this residual polarization can be reoriented by applying an external electric field, and these phases are consequently referred to as ferroelectric.

The ferroelectric, smectic liquid crystalline phase has the microlayer structure generally typical for smectic liquid crystalline phases, the longitudinal molecular axes of the chiral mesogenic compounds in individual microlayers having a tilt angle $\theta$ of $+\alpha$ or $-\alpha$ with respect to the layer normal $\vec{Z}$. The direction of inclination or the tilt angle $\theta$ of the longitudinal molecular axes in a microlayer with respect to the layer normal $\vec{Z}$ is generally characterized by the director $\vec{n}$. In general, orientation of the individual lateral dipoles of the chiral mesogenic compounds or groups leads to a macroscopic dipole moment at right angles to the director $\vec{n}$ and at right angles to the layer normal $\vec{Z}$. However, provided that the ferroelectric smectic liquid crystalline phase is not restricted in terms of space, the director $\vec{n}$ in said phase generally performs a precession movement about the layer normal $\vec{Z}$ on passing through the individual microlayer planes, ie. the polarization vector $\vec{P}$, which indicates the direction of the total dipole moment of the phase, describes a helix through the ferroelectric smectic liquid crystalline phase, resulting in a total dipole moment of 0.

The same also occurs in crystalline ferroelectric smectic liquid crystalline phases, which usually have a polydomain structure, the polarization vector $\vec{P}$, which indicates the direction of the total dipole moment of the phase, pointing in a different direction in each domain, so that a total dipole moment of 0 results.

If, however, such a ferroelectric smectic liquid crystalline phase is limited in its thickness and is either heated in an external electric field of suitable sign and of suitable orientation or exposed to a very strong external electric field of suitable sign and of suitable orientation, the direction of polarization in the ferroelectric smectic liquid crystalline phase can be reversed when a limiting field strength dependent on the particular chiral mesogenic compound used is exceeded, so that its polarization vector $\vec{P}$ coincides again with the external electric field. This reversal of polarization is based on the tilting of the longitudinal molecular axes of the chiral mesogenic compounds or groups from the tilt angle $\theta$ of $+\alpha$ to the tilt angle $\theta$ of $-\alpha$ or vice versa. A new ferroelectric smectic liquid crystalline order state thus forms in the phase. If these two ferroelectric smectic liquid crystalline order states are thermodynamically stable, the term enantiotropic, ferroelectric smectic liquid crystalline behavior is used. Since in this case too, the tilting of the longitudinal molecular axes of the chiral mesogenic compounds or groups describes a conical path, the change between these two order states takes place very rapidly, and the switching times $\tau$ for switching the phase to and fro between the two order states are therefore also extremely short.

It is known that this behavior is particularly pronounced when the chiral mesogenic compounds are present in a layer whose thickness d is smaller than the pitch G of the helix along which the director n̄ executes its precession movement through the ferroelectric smectic liquid crystalline phase. In such a macroscopic layer, the helix described by the precession movement of the director n̄ is spontaneously wound up so that the chiral mesogenic compounds or groups have only two possibilities for orienting themselves.

Chiral mesogenic compounds and groups which are to be used according to the invention and which are very particularly advantageous are those in which, after local exposure to an electric field, one of the chiral smectic liquid crystalline order states or one of the two thermodynamically stable (enantiotropic), ferroelectric smectic liquid crystalline order states can be locally frozen in glassy form at room temperature, the relevant chiral mesogenic compounds or groups in the other parts of the organic material which are not exposed to the electric field being present either in another chiral smectic liquid crystalline order state or in the other thermodynamically stable, ferroelectric, liquid crystalline order state, in another, not necessarily ferroelectric, liquid crystalline phase, in disordered microdomains (scattering centers) or in an isotropic I phase. According to the invention, it is very particularly advantageous if the chiral mesogenic compounds or groups are present in another chiral smectic liquid crystalline order state or the other thermodynamically stable, ferroelectric smectic liquid crystalline order state.

The recording layer (a) has an additional advantage if the chiral mesogenic compounds or groups present in it are transformed into the isotropic I phase below 200° C. ie they have a clear point below 200° C.

It is very particularly advantageous for the recording layer (a) if the organic material present in said layer and having permanent dipoles possesses a glass transition temperature Tg above 25° C.

Examples of compounds which exhibit chiral smectic or enantiotropic, ferroelectric smectic liquid crystalline behavior and are particularly suitable for the intended use according to the invention are disclosed in EP-A-0 184 482, EP-A-0 228 703, EP-A-0 258 898, EP-A-0 231 858, EP-A-0 231 857, EP-A-0 271 900 or EP-A-0 274 128 or are described in German Patent Application P 39 17 196.5.

Accordingly, the recording layers (a) which consist of chiral mesogenic compounds of the above-mentioned type or which contain chiral mesogenic groups of the abovementioned type have very particular advantages when used according to the invention and are therefore very particularly suitable for the novel process.

In the very useful novel recording layers (a), the microlayer planes of the chiral smectic or ferroelectric smectic liquid crystalline phase which is formed by the chiral mesogenic compounds or groups are oriented at right angles to the plane of the recording layer (a). In general, the very useful ferroelectric smectic liquid crystalline recording layers (a) to be employed according to the invention have a spontaneous ferroelectric polarization $P_s$ or a dipole density or a sum of the oriented dipole moments per unit volume of the particular recording layer (a) used of from 1 to 300, advantageously from 10 to 300, in particular from 20 to 300, $nC/cm^2$.

Said recording layers (a) generally have no polarization in the absence of an electric field. However, a polarization proportional to the induced tilt angle $\theta$ can be induced by means of an applied field and frozen in the glassy state, the dipole density or the sum of the oriented dipole moments per unit volume and degree of the particular recording layer (a) used being from 0.05 to 20, advantageously from 0.5 to 20, in particular from 0.9 to 10, $nC/cm^2\theta$.

In general, the very useful recording layer (a) to be used according to the invention has a thickness d of from 0.1 to 20 μm. If it is more than 20 μm thick, a loss of orientation may occur, whereas it may be deformed, for example by capillary effects, at a thickness d of <0.1 μm. The thickness range of from 0.1 to 20 μm is thus an optimum within which the thickness d of the recording layer (a) can be widely varied and adapted to the particular requirements which arise from the performance characteristics required in each case on the one hand and physicochemical properties of the particular organic material used on the other hand. Within this thickness range, the range from 0.1 to 10 μm, advantageously from 0.1 to 8 μm, in particular from 0.2 to 5 μm, is particularly noteworthy because the excellent recording layers (a) having a thickness within this range have very particular advantages when the novel process is carried out, in particular higher sensitivity to imagewise exposure to an electric field and better stability of the residual electrical polarization image.

The production of the recording layers (a) to be used according to the invention has no special features with regard to the method; instead, said layers are produced from the conventional and known suitable organic materials described above, some of which are commercially available, in particular from the low molecular weight chiral mesogenic compounds exhibiting chiral smectic liquid crystalline behavior and/or enantiotropic, ferroelectric smectic liquid crystalline behavior or from the crosslinked or noncrosslinked polymers which have chiral mesogenic side groups exhibiting chiral smectic liquid crystalline behavior and/or enantiotropic, ferroelectric smectic liquid crystalline behavior, by the conventional and known methods for the production of thin layers.

Examples of suitable methods for the production of thin layers from low molecular weight chiral mesogenic compounds of the stated type and the relevant compounds themselves are disclosed in, for example, U.S. Pat. No. 4,752,820, WO-A-87/07890 or WO-A-86/02937.

Furthermore, EP-A-0 184 482, EP-A-0 228 703, EP-A-0 258 898, EP-A-0 231 858, EP-A-0 231 857, EP-A-0 271 900 and EP-A-0 274 128 disclose the methods for the production of thin layers from crosslinked or noncrosslinked polymers having chiral mesogenic side groups of the stated type and the relevant polymers themselves, or they are described in detail in, for example, EP-A-0 399 279. The methods described herein for the production of thin layers and the polymers used are particularly preferably employed for the production of the recording layers (a) to be used according to the invention.

To carry out the novel process, the recording layer (a) to be used according to the invention, having the desired suitable thickness, is applied in a conventional manner to the orientation layer (e) of an electrically conductive substrate (b), which contains one or more dimensionally stable substrate layers (c), an electrode layer (d) and an orientation layer (e) one on top of the other in the stated order, resulting in a recording element (A, D, E) which contains at least the stated layers (c), (d), (e) and (a) one on top of the other in the stated order.

Examples of dimensionally stable substrate layers (c), electrode layers (d) and orientation layers (e) which are suitable for producing the recording element (A, D, E) to be used in the novel process are disclosed in WO-A-86/02937, WO-A-87/07890, U.S. Pat. No. 4,752,820, GB-A-2 181 263, U.S. Pat. No. 4,752,820, EP-A-0 184 482, EP-A-0 205 187, EP-A-0 226 218, EP-A-0 228 703, EP-A-0 231 857, EP-A-0 231 858, EP-A-0 258 898, EP-A-0 271 900 or EP-A-0 274 128, or they are described in EP-A-0 399 279.

In carrying out the novel process, a pattern of surface charges which corresponds to the imagewise action of the electric field, ie. residual electrical polarization image, is produced in the surface of the recording layer (a) by imagewise exposure to an electric field. This residual electrical polarization image is composed either of electrically positively and electrically negatively charged parts or of electrically positively or electrically negatively charged parts and uncharged parts.

According to the invention, this pattern of surface charges or the residual electrical polarization image is produced without, or almost without, formation of free charge carriers by the reversible imagewise orientation of some or all of the permanent dipoles present in the recording layer (a).

According to the invention, this may take place
(i) in heated or unheated recording layers (a) by reversible imagewise destruction of the orientation of some of the oriented permanent dipoles present in the recording layer (a),
(ii) in heated or unheated recording layers (a) by reversible imagewise modification or reversal of the orientation of some of the oriented permanent dipoles present in the recording layer (a) or
(iii) in heated or unheated recording layers (a) by imagewise orientation of some of the unoriented permanent dipoles present in the recording layer (a)

during imagewise exposure of the recording layer (a) to an electric field.

According to the invention, imagewise exposure to an electric field which is generated over movable and/or structured write means is advantageous.

The pattern of surface charges which results from the novel procedure, or the residual electrical polarization image, can, after being used for the intended purpose, be deleted either by uniform exposure to an electric and/or magnetic field without formation of free charge carriers and with uniform orientation of all permanent dipoles present in the recording layer (a) or by uniform destruction of the orientation of the permanent dipoles which is present in the individual parts of the pattern or of the image. According to the invention, an electric field is advantageous in this case too.

According to the invention, a further pattern of surface charges or a residual electrical polarization image can be produced in the recording layer (a) after the deletion process, and the novel process is therefore reversible.

An example of an intended use, which is preferred according to the invention, of the pattern of surface charges or the residual electrical polarization image is its treatment with liquid or solid toners, after which the resulting toner image can be transferred to another surface, with the result that a photocopy of the pattern or of the image forms on the other surface.

According to the invention, the treatment with toner can then be repeated, ie. a plurality of photocopies can be obtained from one pattern of surface charges or from one residual electrical polarization image, which is a very particular advantage of the novel process. However, the pattern or image present in the recording layer (a) can be deleted again in the above-mentioned manner, after which a further pattern or image can be produced in the novel manner and can be used for copying purposes after treatment again with a toner.

Furthermore, according to the invention, the residual electrical polarization image which is produced in the novel manner and is composed of electrically positively and electrically negatively charged parts or contains these parts can be treated simultaneously or successively with two or more liquid or solid toners of opposite electrical charge, resulting in a two-color or multicolor toner image which, after it has been transferred from the recording layer (a) to another surface, gives a two-color or multicolor photocopy. Further advantages are obtained when two or more optically highly contrasting toners are used. In this case too, according to the invention a plurality of photocopies can be obtained from one and the same residual electrical polarization image.

However, it is also possible for the pattern of surface charges produced in the novel manner or the residual electrical polarization image to be treated with one or more liquid or solid toners, after which the resulting toner image is fixed, for example by heating. Of course, this fixed toner image produced by the novel procedure can no longer be deleted, and this embodiment of the novel process is therefore irreversible. However, this is offset by the fact that the fixed toner image can be developed by washing out the parts of it which have not been treated with the toner with the aid of suitable developers, so that a relief layer which can be used, inter alia, for printing purposes results on the recording element.

The novel process can be carried out using a very wide range of apparatuses.

According to the invention, however, it is advantageous if the apparatus according to the invention is used for carrying out the novel process.

The novel apparatus comprises one or more of the recording elements (A, D, E) described above in detail and one or more apparatuses (B) having one or more counter-electrodes (C, F) which serve for imagewise exposure to an electric field.

According to the invention, it is advantageous if the apparatus (B) for imagewise exposure to an electric field contains a structure and/or movable counter-electrode (C, F).

It is also advantageous, according to the invention, if the apparatus (B) is arranged so that the counter-electrode (C, F) can be removed again from the recording element (A, D, E). Advantageously, the counter-electrode (C, F) is in direct, non-frictional contact with the recording layer (a). It may be in the form of a point which can be moved at a suitable relative velocity over the recording element (A, D, E), or in the form of a fixed electrode strip having point-like electrodes, all of which can be activated separately. The counter-electrode (C, F) of the apparatus (B) is switched opposite to the electrode layer (d) of the electrically conductive substrate (b), so that a field $+E$ or $-E$ is present at the counter-electrode (C, F) and ground at said electrode layer (d), or a field $+E$ at the counter-electrode (C, F) and a field E or ground in the electrode layer (d) or a field $-E$ at the counter-electrode (C, F) and a field $+E$ or ground at the electrode layer (d).

The novel apparatus may contain a flat or a roller-like recording element (A, D, E). The roller-like recording element (A, D, E) can be rotated past the fixed counter-electrode (C, F) in order to record information.

Furthermore, the novel apparatus may contain one or more apparatuses (H) for treating the pattern of surface charges which is produced in the recording layer (a) with solid or liquid toners, one or more apparatuses (I) for transferring the toner image from the recording layer (a) to another surface, or alternatively one or more apparatuses (J) for fixing the toner image, and one or more apparatuses (K) for producing electric and/or magnetic fields which can uniformly penetrate the recording element (A, D, E).

The apparatus (K) is advantageously arranged so that it can be removed again from the recording element (A, D, E). In general, it is in direct, non-frictional contact with the recording layer (a). It may be in the form of a flat or curved conductive plate or of a roller, which is moved at a suitable relative velocity over the recording element (A, D, E). When used for generating electric fields, the apparatus (K) is switched opposite to the electrode layer (d) of the electrically conductive substrate (b). The apparatus (K) may furthermore also be used for uniform heating of the recording element (A, D, E).

According to the invention, it is advantageous if the surface of the apparatus (K) is either structured in such a way that it acts as an orientation layer (g) or covered by an orientation layer (g), which either corresponds in its composition and structure to the orientation layer (e) of the recording element (A, D, E) or differs therefrom. Alternatively, the surface of the apparatus (K) may be covered by a polysiloxane layer (h).

In addition, the novel apparatus contains conventional and known electrical and/or mechanical apparatuses which are useful for controlling the novel apparatus, such as electrical and/or mechanical control systems and servo motors. The novel apparatus may also be connected to a process computer and controlled by it.

The novel process can in principle be carried out in six different ways with the aid of the novel apparatus, these being described below by way of example:

1. A suitable voltage of from 0 to 150 V is applied between the apparatus (K) and electrode layer (d) of the heated recording element (A, D, E). Thereafter, the apparatus (K) is moved over the recording layer (a) of the recording element (A, D, E) at a suitable relative speed. The permanent dipoles present in the recording layer (a) are thus uniformly oriented or the orientation of the permanent dipoles is uniformly reinforced. Imagewise exposure to the electric field of the counter-electrode (C, F) takes place immediately behind the apparatus (K), resulting in the pattern of surface charges or in the residual electrical polarization image. The recording element (A, D, E), which now contains the pattern or the image, is then fed at a relative speed matched with the movement of the roller-like counter-electrode (C, F) to the toner-application apparatus (H) and is treated with the toner there. The recording element (A, D, E) treated with toner is then moved at the matched relative velocity to the apparatus (I) for transfer of the toner image from the recording layer (a) to another surface. Thereafter, either the toner-free recording element can be returned to the toner-application apparatus (H) and to the apparatus (I) for transfer of the toner image, with the result that two or more copies of the original pattern or image can be produced, or the apparatus (K) can be again moved over the recording element (A, D, E) at a matched relative velocity in order to delete the pattern or the image.

2. Instead of being conveyed to an apparatus (I) for transferring the toner image from the recording layer (a) to another surface, the toner-treated recording element (A, D, E) can be moved to an apparatus (J) for fixing the toner image, after which the recording element (A, D, E) leaves the novel apparatus for further processing in a suitable manner.

3. An electric field oriented at right angles to the recording layer (a) is applied imagewise to the recording element (A, D, E), having a nonuniformly oriented recording layer (a), with the aid of an electrode strip (C, F), with the result that the pattern of surface charges or the residual electric polarization image forms. Thereafter, the recording element (A, D, E) is moved at a suitable relative velocity, as described under Number 1, to the apparatuses for toner application (H) and for transfer of the toner image from the recording layer (a) to another surface (I) or, alternatively, to an apparatus (J) for fixing the toner image. If the pattern or image present in the recording layer (a) is to be deleted again, the recording layer (a) is heated until the imagewise orientation of the permanent dipoles in the recording layer (a) is destroyed.

4. This embodiment is carried out as described under Number 1, except that the apparatus (K) has a potential of from $-1$ to $-150$ V, relative to ground, resulting in an electrical polarization image which is composed of electrically positively and negatively charged parts, and that the residual electrical polarization image is treated, advantageously successively, with two optically highly contrasting toners of opposite electric charge in the toner-application apparatus (H), with the result that a two-color toner image forms. This is used in the same way as described for the embodiment under Number 1 for the production of photocopies, which in this case, however, are two-color.

5. A suitable electric field is applied between the apparatus (K) and the electrode layer (d) of the recording element (A, D, E). Thereafter, the apparatus (K) is moved at a suitable relative speed over the recording layer (a) of the recording element (A, D, E). In contrast to the embodiment described in Number 1, in this case the temperature and the field strength are chosen so that the recording layer (a) is not uniformly oriented. Imagewise exposure to the electric field of the counter-electrode (C, F) having a positive sign, takes place immediately behind the moving apparatus (K), resulting in a first pattern of surface charges or a first residual polarization image. This imaging process or process step is then repeated, except that, for this purpose, the polarities of the voltage between the apparatus (K) and the electrode layer (d) are reversed and that a second polarization image differing from the first residual electrical polarization image and having opposite electrical surface charges is formed. The recording element (A, D, E) whose recording layer (a) contains electrically positive and electrically negative parts is then used for producing two-color photocopies in the same manner as described for the embodiment in Number 4.

6. This embodiment corresponds to that described under Number 1, except that the imaging process is carried out for each of the basic colors of a multicolor image, the voltage required for the imagewise exposure to an electric field corresponding to the proportion of the particular basic color in the image. The novel process thus permits the gradation of the tonal values during the production of multicolor images.

EXAMPLE

Process for the production of an image by imagewise exposure to an electric field by the novel process
Experimental method A recording layer (a) about 4 μm thick and consisting of a polymer containing chiral smectic liquid crystalline side groups, in homeotropic orientation, was applied to a conventional and known electrically conductive substrate (b) comprising a glass substrate (c), an electrode layer (d) of indium tin oxide (ITO) and an orientation layer (e) of ground polyimide (ZLI-2640 from Merck AG, Darmstadt). In the imaging process, the ITO electrode layer (d) was earthed. The recording layer (a) was heated to 140° C. The information was then recorded in the heated recording layer (a) with the aid of a movable point having a diameter of 1 mm as a counter-electrode (C, F) at a voltage of +100 V between (C, F) and the ITO electrode layer (d). The distance between the counter-electrode (C, F) and the recording layer (a) was reduced until the field strength between (C, F) and (d) was sufficiently high to reorient the director $\overline{n}$ in the chiral smectic liquid crystalline phase. The director $\overline{n}$ formed in the recording layer (a) a uniform tilt angle $\theta$ of 11° C., corresponding to the applied electric field and measured under a polarization microscope, resulting in a polarization of 10 nC/cm$^2$ calculated from the polarization current curves. The information or structure recorded in this way in the recording layer (a) was frozen in glassy form at room temperature.

The investigation of the frozen structure under the polarization microscope showed that the recording layer (a) was in fact reoriented only where it had come into direct contact with the counter-electrode (C, F). The charge image present on the surface of the recording layer (a) could be treated with a conventional and known dry toner powder. The resulting toner image had a high contrast.

We claim:

1. Means for the production of an image by the imagewise action of an electric field on a recording layer (a), so that a pattern of surface charges which corresponds to the imagewise action of the electric field results on the surface of the recording layer (a), and which comprises
    (A) a recording element, containing
        (a) a recording layer suitable for the process, and
        (b) an electrically conductive substrate, and
    (B) an apparatus for the imagewise action of an electric field on the recording element (A), consisting of a counter-electrode (C), wherein
    (D) the recording layer (a) contains an organic material which solidifies in glassy form, is at most minimally photoconductive and has permanent dipoles, wherein the pattern of surface charges is produced with at most a negligible formation of free charge carriers by imagewise orientation of the permanent dipoles present in the recording layer (a),
    (E) the electrically conductive substrate (b) contains a
        (c) dimensionally stable substrate layer,
        (d) electrode layer and
        (e) orientation layer layer (a) being present directly on the orientation layer (e), and
    (F) the counter-electrode (C) is in direct, non-frictional contact with the recording layer (a) and is arranged in such a way that it can be removed from the recording element (A, D, E), and it has either the form of a fixed electrode strip having point-like electrodes or the form of a point, which can be moved at a relative velocity over the recording element (A, D, E).

2. Means as claimed in claim 1, wherein the electrically conductive substrate (b) can be wholly or partly thermostated.

3. Means as claimed in claim 1, wherein the recording element (A, D, E) is flat.

4. Means as claimed in claim 1, wherein the recording element (A, D, E) is in the form of a roller and can be rotated against the counter-electrode (C, F).

5. Means as claimed in claim 1 comprising
    (H) one or more apparatuses for treating the pattern of surface charges which is produced in the recording layer (a) with solid or liquid toners.

6. Means as claimed in claim 5, comprising
    (I) one or more apparatuses for transferring the toner image from the recording layer (a) to another surface.

7. Means as claimed in claim 5, comprising
    (J) one or more apparatuses for fixing the toner image.

8. Means as claimed in claim 1, comprising
    (K) apparatuses for uniform heating of the recording layer (A, D, E) and for generating electric or magnetic fields which can uniformly penetrate the recording element (A, D, E).

* * * * *

UNITED STATES PATENT AND TRADEMARK OFFICE
CERTIFICATE OF CORRECTION

PATENT NO. : 5,418,555
DATED : May 23, 1995
INVENTOR(S) : Bach et al

It is certified that error appears in the above-indentified patent and that said Letters Patent is hereby corrected as shown below:

On the title page, item [75], the fifth listed inventor's first name should be --Gerhard--.

Column 14, claim 1, line 21, after "layer" first occurrence, insert: --one on top of the other in the stated order, the recording--.

Signed and Sealed this

Twenty-second Day of August, 1995

Attest:

BRUCE LEHMAN

*Attesting Officer*    *Commissioner of Patents and Trademarks*